(12) United States Patent
Tanabe

(10) Patent No.: US 9,593,234 B2
(45) Date of Patent: Mar. 14, 2017

(54) RUBBER COMPOSITION HAVING INTRAMOLECULAR DOUBLE BOND

(71) Applicant: The Yokohama Rubber Co., Ltd., Tokyo (JP)

(72) Inventor: Yusuke Tanabe, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/651,591

(22) PCT Filed: Dec. 13, 2013

(86) PCT No.: PCT/JP2013/083462
§ 371 (c)(1),
(2) Date: Jun. 11, 2015

(87) PCT Pub. No.: WO2014/092181
PCT Pub. Date: Jun. 19, 2014

(65) Prior Publication Data
US 2015/0329708 A1 Nov. 19, 2015

(30) Foreign Application Priority Data
Dec. 13, 2012 (JP) ................................. 2012-271980

(51) Int. Cl.
| | |
|---|---|
| *C08K 5/38* | (2006.01) |
| *B60C 1/00* | (2006.01) |
| *C08L 9/06* | (2006.01) |
| *C08L 21/00* | (2006.01) |

(52) U.S. Cl.
CPC .............. *C08L 9/06* (2013.01); *B60C 1/0008* (2013.04); *B60C 1/0016* (2013.04); *B60C 1/0025* (2013.04); *B60C 1/0041* (2013.04); *C08K 5/38* (2013.01); *C08L 21/00* (2013.01); *B60C 2001/0066* (2013.04); *C08L 2205/02* (2013.01); *C08L 2312/00* (2013.01)

(58) Field of Classification Search
CPC .................................. C08K 5/38; B60C 1/00
See application file for complete search history.

(56) References Cited

U.S. PATENT DOCUMENTS

| | | | |
|---|---|---|---|
| 7,786,200 B2 * | 8/2010 | Hwang ................. | C07F 7/1836 524/262 |
| 2012/0309895 A1 | 12/2012 | Schmidt et al. | |

FOREIGN PATENT DOCUMENTS

| | | |
|---|---|---|
| JP | 56-122853 | 9/1981 |
| JP | 59-036145 | 2/1984 |
| JP | 2009-040915 | 2/2009 |
| WO | WO 2011/101176 A1 | 8/2011 |
| WO | WO 2012/147895 A1 | 11/2012 |

OTHER PUBLICATIONS

International Preliminary Patentability Report and Written Opinion from corresponding PCT application No. PCT/JP2013/083462 dated Jun. 25, 2015 (6 pgs).
International Search Report from corresponding PCT application No. PCT/JP2013/083462 dated Mar. 25, 2014 (4 pgs).

* cited by examiner

*Primary Examiner* — Vickey Nerangis
(74) *Attorney, Agent, or Firm* — Brinks Gilson & Lione

(57) ABSTRACT

Provided is a rubber composition having an intramolecular double bond capable of sulfur cross-linking, comprising at least one of 1 to 100 parts by mass of carbon black and 10 to 150 parts by mass of an inorganic filler other than carbon black, 0.1 to 50 parts by mass of a sulfur-containing compounding agent and 0.1 to 30 parts by mass of a hydrocarbon compound with both terminal groups thioesterified, per 100 parts by mass of the rubber having an intramolecular double bond capable of sulfur cross-linking. This rubber composition can provide a vulcanized substance having excellent toughness, for example, as a part of at least one of a cap tread, a side wall, a belt, an inner liner, a carcass and a bead of a pneumatic tire without substantially reducing processability of an unvulcanized substance and vulcanizate physical properties of the vulcanized substance.

9 Claims, No Drawings

RUBBER COMPOSITION HAVING INTRAMOLECULAR DOUBLE BOND

RELATED APPLICATION

This application is a 35 U.S.C. §371 national phase filing of International Patent Application No. PCT/JP2013/083462, filed Dec. 13, 2013, through which and to which priority is claimed under 35 U.S.C. §119 to Japanese Patent Application No. 2012-271980, filed Dec. 13, 2012, the complete disclosure of which is hereby expressly incorporated by reference.

TECHNICAL FIELD

The present invention relates to a rubber composition having an intramolecular double bond. More specifically, the present invention relates to a rubber composition having an intramolecular double bond capable of sulfur cross-linking which can produce a vulcanized substance having excellent toughness.

BACKGROUND ART

Patent Document 1 describes an additive agent (a monothioester compound) for a rubber composition represented by the general formula $R^3R^2N-X-Y-R^1$. In the formula, Y can be a thioester bond, and specifically, octanethioic-S-acid dimethylaminoethyl, octanethioic-S-acid 2-diethylaminoethyl, propanethioic-S-acid 2-piperazinoethyl and the like are used. In the Patent Document, Mooney viscosity which shows processability, Mooney scorching time which shows processing stability, tan δ which shows low exothermicity, and rolling resistance were measured, and a good Mooney scorching time was not obtained.

PRIOR ART DOCUMENT

Patent Document

Patent Document 1: JP-A-2009-40915

An object of the present invention is to provide a rubber composition having an intramolecular double bond capable of sulfur cross-linking which can produce a vulcanized substance having excellent toughness without substantially reducing processability of an unvulcanized substance and vulcanizate physical properties of the vulcanized substance.

Means for Solving the Problem

The above object of the present invention can be achieved by providing a rubber composition having an intramolecular double bond capable of sulfur cross-linking, comprising at least one of 1 to 100 parts by mass of carbon black and 10 to 150 parts by mass of an inorganic filler other than carbon black; 0.1 to 50 parts by mass of a sulfur-containing compounding agent; and 0.1 to 30 parts by mass of a hydrocarbon compound with both terminal groups thioesterified, per 100 parts by mass of the rubber having an intramolecular double bond capable of sulfur cross-linking.

Effect of the Invention

The rubber composition according to the present invention can provide a vulcanized substance having excellent toughness and significantly increased values of breaking strength, breaking elongation, 100% modulus, 300% modulus and the like without substantially reducing other vulcanizate physical properties and processability of an unvulcanized substance, by compounding a small amount of a hydrocarbon compound having both terminal groups thioesterified and optionally having a substituent such as a hetero atom or a moiety of a functional group having these in a rubber composition having an intramolecular double bond capable of sulfur cross-linking.

EMBODIMENTS FOR CARRYING OUT THE INVENTION

As a rubber having an intramolecular double bond capable of sulfur cross-linking, used is at least one of diene based rubbers constituting each part of a pneumatic tire such as natural rubber, isoprene rubber, butadiene rubber, styrene-butadiene rubber and butyl rubber. In particular, styrene-butadiene rubber or a blended rubber thereof is preferably used. Note that either emulsion-polymerized SBR (E-SBR) or solution-polymerized SBR (S-SBR) can be used as a styrene-butadiene rubber.

Examples of a both terminal groups thioesterified hydrocarbon compound to be compounded in these rubber having an intramolecular double bond capable of sulfur cross-linking include derivatives of hydrocarbon compounds represented by the following general formula [I] or [II].

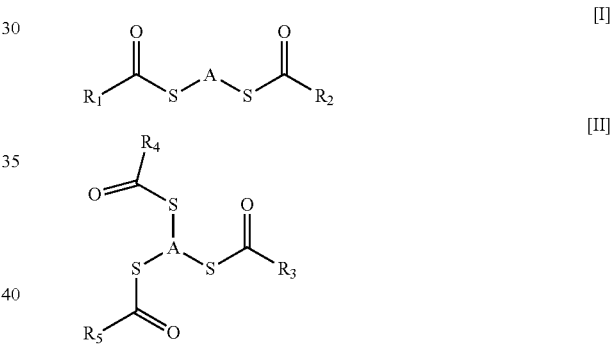

In the formulae, A represents a divalent or trivalent group as an alkylene or oxyalkylene group of $C_1$ to $C_{20}$, an aryl group or an alkylene group substituted with an aryl group; $R_1$, $R_2$, $R_3$, $R_4$ and $R_5$ are the same or different from each other, alkylene or oxyalkylene groups of $C_1$ to $C_{20}$, aryl groups, aralkyl groups, hydroxy groups, amino groups, halogen groups, or hydrogen groups and these groups may be substituted.

For example, 1,8-bis(thiobenzoate)octane as a hydrocarbon derivative represented by the formula [I] may be obtained by allowing 1,8-octanedithiol to react with benzoyl chloride in the presence of a catalyst such as triethylamine. Further, 1,8-bis(thioacetate)octane may be obtained by allowing 1,8-octanedithiol to react with acetic anhydride.

These both terminal groups thioesterified hydrocarbon compounds are used in a rate of 0.1 to 30 parts by mass, preferably about 0.25 to 10 parts by mass, per 100 parts by mass of a rubber having an intramolecular double bond capable of sulfur cross-linking. In a case where the content rate is less than this, the advantageous modification according to the present invention may not be obtained. On the other hand, when it is used in a rate more than this, scorch time will be shortened, resulting in negative effects on unvulcanizate physical properties.

In addition to the both terminal groups thioesterified hydrocarbon compound, at least one of and preferably both of about 1 to 100 parts by mass, preferably 5 to 80 parts by mass, of carbon black and about 10 to 150 parts by mass, preferably about 15 to 120 parts by mass, of an inorganic filler other than carbon black, preferably silica; and about 0.1 to 50 parts by mass, preferably about 0.5 to 20 parts by mass, of a sulfur-containing compounding agent are compounded as essential components in a rubber composition.

As the carbon black, any carbon black, for example, a GPF-SAF grade carbon black for reinforcing rubber manufactured by the oil furnace method and the like can be used. Further, inorganic fillers other than carbon black include silica, talc, clay and the like, and silica is preferably used.

In a case where silica is used, the following can be used: a sulfur-free silane coupling agent, for example, alkoxysilane such as vinylmethoxysilane, vinyltrimethoxysilane, vinylethoxysilane, vinyltriethoxysilane, γ-methacryloxypropyltrimethoxysilane, γ-methacryloxypropylmethyldimethoxysilane, γ-methacryloxypropyldimethylmethoxysilane, γ-acryloxypropylmethyldiethoxysilane, γ-acryloxypropyldimethylethoxysilane, γ-acryloxypropyltriethoxysilane, N-(propyltriethoxysilane)maleimide, or for example, aryloxysilane such as vinylphenoxysilane, vinyltriphenoxysilane, γ-methacryloxypropyltriphenoxysilane, γ-methacryloxypropylmethyldiphenoxysilane, γ-methacryloxypropyldimethylphenoxysilane, γ-acryloxypropylmethyldiphenoxysilane, γ-acryloxypropyldimethylphenoxysilane, γ-acryloxypropyltriphenoxysilane and N-(propyltriphenoxysilane)maleimide.

Further, as the sulfur-containing compounding agent, sulfur, a sulfur-containing vulcanization accelerator, a sulfur-containing silane coupling agent and the like are used at a rate of about 0.1 to 50 parts by mass, preferably about 0.5 to 20 parts by mass.

As the sulfur-containing vulcanization accelerator, used are, for example, vulcanization accelerators such as thiazole based agents (MBT, MBTS, ZnMBT and the like), sulfenamide based agents (CBS, DCBS, BBS and the like), thiuram based agents (TMTD, TMTM, TBzTD, TETD, TBTD and the like), dithiocarbamate based agents (ZTC, NaBDC and the like) and xanthate based agents (ZnBX and the like).

As the sulfur-containing silane coupling agent, the following are used: bis(trialkoxysilylpropyl)sulfide which has an alkoxysilyl group which is to react with a silanol group on the surface of silica and a sulfur chain which is to react with a polymer:

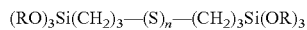

R: an alkyl group having 1 to 2 carbon atoms
n: an integer of 1 to 4.

For example, used are bis(triethoxysilylpropyl)tetrasulfide, bis(trimethoxysilylpropyl)tetrasulfide, bis(triethoxysilylpropyl)disulfide, bis(trimethoxypropyl)disulfide and the like. In addition, the following may be used: a mercapto based silane coupling agent such as γ-mercaptopropyltriethoxysilane, 3-[ethoxybis(3,6,9,12,15-pentaoxaoctacosane-1-yloxy)silyl]-1-propanethiol; a thiocarboxylate based silane coupling agent such as 3-octanoylthiopropyltriethoxysilane; a thiocyanate based silane coupling agent such as 3-thiocyanatepropyltriethoxysilane; and the like.

A composition may be prepared by appropriately compounding other compounding agents commonly used as compounding agents for rubber, for example, a processing aid such as stearic acid, zinc oxide, a softener, a plasticizing agent, an antioxidant, if desired, and then kneading by a common method using a kneading machine or a mixer such as a kneader and a Banbury mixer, and an open roll and the like. The resulting composition is molded into a predetermined shape, and then vulcanized at a vulcanizing temperature that depends on the types and compounding rate of a rubber having an intramolecular double bond capable of sulfur cross-linking, a vulcanizing agent and a vulcanization accelerator used to form predetermined regions of a pneumatic tire, preferably a cap tread, a side wall, a belt, an inner liner, a carcass, a bead and the like.

EXAMPLES

Next, the present invention will be described with reference to Examples.

Reference Example 1

To a 100 ml one-necked eggplant-shaped flask, 1.78 g of 1,8-octanedithiol (Tokyo Chemical Industry Co., Ltd.) and 20 ml of tetrahydrofuran (the same manufacturer as above) were added under the conditions of room temperature. Then, to the resulting solution, 2.81 g of benzoyl chloride (the same manufacturer as above) was added, and stirred for 15 minutes under the conditions of room temperature. To the reaction mixture, 5 ml of triethylamine (the same manufacturer as above) was added, and stirred for 15 hours. Subsequently, the solvent was distilled off from the reaction mixture, and isolated and purified by silica gel column chromatography to obtain 2.31 g (yield: 60%) of the objective 1,8-bis(thiobenzoate)octane as a white powder.

$^1$H and $^{13}$C-NMR spectra of the reaction product indicated that the raw material had disappeared and the product of interest had been obtained with high purity.

$^1$H-NMR (400 MHz, 298 k, CDCl$_3$): δ=7.97 (dd, J=8.2 Hz, J=1.4 Hz, 4H)
7.57 to 7.51 (m, 2H)
7.43 (t, J=7.96 Hz, 4H)
3.07 (t, J=7.28 Hz, 4H)
1.67 (m, 4H)
1.43 (m, 4H)
1.35 (m, 4H)
$^{13}$C-NMR (100 Mz, 298 k, CDCl$_3$): δ=192.1
137.3
133.2
128.5
127.2
29.5
29.0 (×2)
28.8

To a 100 mL one-necked eggplant-shaped flask, 0.93 ml of 1,8-octanedithiol (Tokyo Chemical Industry Co., Ltd.) and 30 ml of methylene chloride (the same manufacturer as above) were added under the conditions of room temperature. Then, to the resulting solution, 1.92 ml of acetic anhydride (the same manufacturer as above) was added, and stirred for 5 minutes under the conditions of room temperature. To the reaction mixture, 3.51 ml of triethylamine (the same manufacturer as above) was added, and stirred for 15 hours. Subsequently, the solvent was distilled off from the reaction mixture, and isolated and purified by silica gel column chromatography to obtain 1.74 g (yield: 98%) of the objective 1,8-bis(thioacetate)octane as a white powder.

$^1$H and $^{13}$C-NMR spectra of the reaction product indicated that the raw material had disappeared and the product of interest had been obtained with high purity.

$^1$H-NMR (400 MHz, 298 k, CDCl$_3$): δ=2.86 (t, J=7.28 Hz, 4H)

2.32 (s, 6H)
1.56 (m, 4H)
1.27 to 1.40 (m, 8H)
$^{13}$C-NMR (100 Mz, 298 k, CDCl$_3$): δ=196.0
30.6
29.5
29.1
28.9
28.7

Comparative Example 1 (Standard Example)

| | |
|---|---|
| E-SBR | 80 parts by mass |
| (solution-polymerized SBR; Zeon Corporation, Nipol 1502) | |
| BR | 20 parts by mass |
| (the same manufacturer as above, Nipol BR 1220) | |
| Silica (Nippon silica, Nipsil AQ) | 50 parts by mass |
| Carbon black | 5 parts by mass |
| (Showa Cabot K.K., Showblack N339M) | |
| Zinc oxide | 3 parts by mass |
| (Seido Chemical Industry Co., Ltd., Zinc White No. 3) | |
| Stearic acid (NOF Corporation) | 1 part by mass |
| Antioxident S-13 | 1 part by mass |
| (Sumitomo Chemical Co., Ltd., Antigen 6C) | |
| Silane coupling agent (Evonik Degussa, Si69) | 4 parts by mass |
| Oil (Showa Shell Sekiyu K.K., Extract No. 4S) | 6 parts by mass |
| Sulfur (Karuizawa Refinery, oil-treated sulfur) | 2 parts by mass |
| Sulfur-containing vulcanization accelerator CZ | 1 part by mass |
| (Sanshin Chemical Industry Co., Ltd., Sanceler CM-PO) | |
| Vulcanization accelerator DPG | 0.5 parts by mass |
| (the same manufacturer as above, Sanceler D-G) | |

Components except for the vulcanization-related components (the vulcanization accelerator and sulfur) among the above components were kneaded in a 1.7 L closed Banbury mixer for 5 minutes, and then dumped out of the mixer and cooled to room temperature. Subsequently, the vulcanization-related components were added to this kneaded material, and kneaded with an open roll to obtain a rubber composition.

This rubber composition was press vulcanized in a predetermined mold at 160° C. for 20 minutes to obtain a vulcanized rubber test piece. The resulting vulcanized rubber test piece was measured for the following properties.

Viscosity: in accordance with JIS K6300
    Mooney viscosity ML$_{1+4}$ (100° C.) was obtained with an L-type rotor, and expressed as an index in which Standard Example was taken as 100
    A smaller index is better
Scorch time (T5): in accordance with JIS K6300
    A time (minute) for a viscosity to increase by 5 points at 125° C. was measured, and expressed as an index in which Standard Example was taken as 100
    A larger index means better processability
Payne's effect ΔG: The prepared unvulcanized rubber composition was vulcanized at 160° C. for 20 minutes, then a strain shear stress G' at a strain of 0.98% and a strain shear stress G' at a strain of 30.0% were measured to calculate the difference
    G'0.98 (MPa)-G'30.0 (MPa) as the Payne's effect using a strain shear stress measurement machine (Alpha Technology Co., Ltd., RPA2000)
    It is expressed as an index in which Standard Example was taken as 100
    A smaller index means that the Payne's effect is smaller, and the dispersibility of silica is superior M100, M300, breaking strength and breaking elongation: in accordance with JIS K6251
    A JIS No. 3 dumbbell-shaped test piece was punched out from the vulcanized rubber test piece, and a tensile test at a tension rate of 500 mm/minute was performed to measure 100% modulus (M100), 300% modulus (M300), breaking strength (TB) and breaking elongation (EB) of the vulcanized rubber test piece at room temperature
    They are all expressed as an index in which Standard Example was taken as 100
    A larger index means that modulus, strength and elongation are better Examples 1 to 3

Substances were obtained as in Comparative Example 1 except that 1,8-bis(thiobenzoate)octane was further added to the rubber composition in an amount of 0.25 parts by mass (Example 1) or 0.5 parts by mass (Example 2). Further, a substance was obtained as in Comparative Example 1 except that 1,8-bis(thioacetate)octane was further added to the rubber composition in an amount of 0.5 parts by mass (Example 3).

Comparative Example 2

A substance was obtained as in Comparative Example 1 except that a silane coupling agent (GE Tokyo Silicone, NXT silane) was further added to the rubber composition in an amount of 0.5 parts by mass.

The results obtained from Examples and Comparative Examples as described above are shown in the following table.

TABLE

| Measured Item | Comp. Ex. 1 | Ex. 1 | Ex. 2 | Ex. 3 | Comp. Ex. 2 |
|---|---|---|---|---|---|
| Unvulcanizate | | | | | |
| Viscosity | 100 | 103 | 104 | 103 | 97 |
| Scorch (T5) | 100 | 101 | 102 | 100 | 97 |
| Vulcanizate | | | | | |
| ΔG | 100 | 92 | 87 | 94 | 103 |
| M100 | 100 | 105 | 110 | 108 | 99 |
| M300 | 100 | 104 | 108 | 107 | 94 |
| TB | 100 | 109 | 118 | 117 | 101 |
| EB | 100 | 115 | 114 | 116 | 104 |

The invention claimed is:

1. A rubber composition having an intramolecular double bond capable of sulfur cross-linking, comprising at least one of 1 to 100 parts by mass of carbon black and 10 to 150 parts by mass of an inorganic filler other than carbon black, 0.1 to 50 parts by mass of a sulfur-containing compounding agent and 0.1 to 30 part by mass of two or three terminal groups thioesterified hydrocarbon or oxyhydrocarbon compound, per 100 parts by mass of the rubber having an intramolecular double bond capable of sulfur cross-linking,
    wherein the both terminal groups thioesterified hydrocarbon or oxyhydrocarbon compound is a hydrocarbon derivative represented by the general formula [I] or [II],

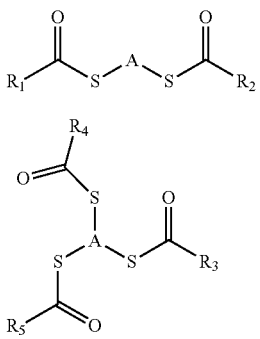

wherein A represents a divalent or trivalent group as an alkylene or oxyalkylene group of $C_1$ to $C_{20}$, an aryl group or an alkylene group substituted with an aryl group, and $R_1$, $R_2$ $R_3$, $R_4$ and $R_5$ are the same or different from each other, akylene or oxyalkylene groups of $C_1$ to $C_{20}$, aryl groups, aralkyl groups, hydroxy groups, amino groups halogen groups, or hydrogen groups.

2. The rubber composition having an intramolecular double bond capable of sulfur cross-linking according to claim 1, wherein the both terminal groups thioesterified hydrocarbon or oxyhydrocarbon compound represented by general formula [I] is 1,8-bis(thiobenzoate)octane and/or 1,8-bis(thioacetate)octane.

3. The rubber composition having an intramolecular double bond capable of sulfur cross-linking according to claim 1, wherein the inorgranic filler other than carbon black is silica.

4. The rubber composition having an intramolecular double bond capable of sulfur cross-linking according to claim 3, further comprising 1 to 15 parts by mass of a sulfur cross-free silane coupling agent.

5. The rubber composition having an intramolecular double bond capable of sulfur cross-linking according to claim 1, wherein the sulfur-containing compounding agent is sulfur, a sulfur-containing vulcanization accelerator or a sulfur-containing silane coupling agent.

6. The rubber composition having an intramolecular double bond capable of sulfur cross-linking according to claim 1, which is used as a material for molding of a part of a pneumatic tire.

7. The rubber composition having an intramolecular double bond capable of sulfur cross-linking according to claim 6, which is used as a material for molding of a part of at least one of a cap tread, a side wall, a belt, an inner liner, a carcass and a bead of a pneumatic tire.

8. A pneumatic tire obtained by molding and vulcanizing the rubber composition having an double bond capable of sulfur cross-linking according to claim 6.

9. A pneumatic tire obtained by molding and vulcanizing the rubber composition having an intramolecular double bond capable of sulfur cross-linking according to claim 7.

* * * * *